(12) United States Patent
Nagayasu et al.

(10) Patent No.: US 10,418,872 B2
(45) Date of Patent: Sep. 17, 2019

(54) ROTARY ELECTRIC MACHINE

(71) Applicant: Mitsubishi Electric Corporation, Chiyoda-ku, Tokyo (JP)

(72) Inventors: Tetsuya Nagayasu, Tokyo (JP); Masahiro Kondo, Tokyo (JP); Kiyonori Koga, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 355 days.

(21) Appl. No.: 15/303,923

(22) PCT Filed: Jul. 25, 2014

(86) PCT No.: PCT/JP2014/069684
§ 371 (c)(1),
(2) Date: Oct. 13, 2016

(87) PCT Pub. No.: WO2016/013108
PCT Pub. Date: Jan. 28, 2016

(65) Prior Publication Data
US 2017/0033633 A1 Feb. 2, 2017

(51) Int. Cl.
*H02K 3/24* (2006.01)
(52) U.S. Cl.
CPC ..................... *H02K 3/24* (2013.01)
(58) Field of Classification Search
CPC ....................................................... H02K 3/24
(Continued)

(56) References Cited

U.S. PATENT DOCUMENTS 2,653,255 A * 9/1953 Baudry ............. H02K 3/22
 122/182.1
2,833,944 A * 5/1958 Willyoung ......... H02K 3/22
 310/61

(Continued)

FOREIGN PATENT DOCUMENTS

CN 101064450 A 10/2007
EP 1 850 458 A2 10/2007
(Continued)

OTHER PUBLICATIONS

Office Action dated May 31, 2018, by the Chinese Patent Office in corresponding Chinese Patent Application No. 201480080595.4 and English translation of the Office Action. (14 pages).

(Continued)

*Primary Examiner* — Robert W Horn
(74) *Attorney, Agent, or Firm* — Buchanan Ingersoll & Rooney PC (57) ABSTRACT

To obtain a rotary electric machine in which an insulation failure does not occur even when the output of the rotary electric machine is increased by improving the cooling performance at the rotor winding ends. The rotary electric machine includes a rotor winding wound around a rotor core with a gap, rotor winding ends formed by the rotor winding protruding to an end surface of the rotor core in an axial direction, spacers arranged between adjacent rotor winding ends, mountain-shaped winding support portions provided on both surfaces of the spacers and having an apex with an obtuse angle, meandering ventilation paths formed on both surfaces of the spacers by the mountain-shaped winding support portions and wave-shaped winding support portions formed in the meandering ventilation paths along the meandering ventilation paths.

5 Claims, 12 Drawing Sheets

(58) Field of Classification Search
USPC .......................................................... 310/59
See application file for complete search history.

(56) References Cited

U.S. PATENT DOCUMENTS

| | | | | |
|---|---|---|---|---|
| 4,335,324 | A * | 6/1982 | Fujioka | H02K 9/12 310/59 |
| 6,316,859 | B1 * | 11/2001 | Aoyama | H02K 3/24 310/214 |
| 6,346,754 | B1 * | 2/2002 | Kieda | H02K 3/24 310/270 |
| 6,452,294 | B1 * | 9/2002 | Vandervort | H02K 3/24 310/270 |
| 6,465,917 | B2 * | 10/2002 | Wetzel | H02K 3/24 310/52 |
| 6,486,575 | B2 * | 11/2002 | Miller | B29C 70/02 310/214 |
| 6,870,299 | B1 * | 3/2005 | Moeleker | H02K 1/32 310/270 |
| 7,081,695 | B2 * | 7/2006 | Miller | H02K 3/487 29/458 |
| 7,342,345 | B2 * | 3/2008 | Salamah | H02K 3/24 310/270 |
| 8,115,352 | B2 * | 2/2012 | Neje | H02K 1/32 310/260 |
| 8,525,376 | B2 * | 9/2013 | Neje | H02K 3/24 310/270 |
| 2002/0093253 | A1 | 7/2002 | Miller | |
| 2005/0127779 | A1 | 6/2005 | Miller | |
| 2006/0108892 | A1 * | 5/2006 | Enos | H02K 3/24 310/260 |
| 2007/0252473 | A1 | 11/2007 | Taniyama et al. | |
| 2013/0285488 | A1 * | 10/2013 | Kazmin | H02K 3/24 310/65 |
| 2016/0149452 | A1 * | 5/2016 | Garmon | H02K 3/24 310/59 |
| 2017/0033633 | A1 * | 2/2017 | Nagayasu | H02K 3/24 |
| 2017/0063199 | A1 * | 3/2017 | Kim | H02K 3/38 |
| 2017/0179781 | A1 * | 6/2017 | Fan | H02K 1/20 |
| 2019/0001802 | A1 * | 1/2019 | Shinkai | B60K 1/00 |

FOREIGN PATENT DOCUMENTS

| | | |
|---|---|---|
| EP | 2 112 746 A1 | 10/2009 |
| JP | 52-151304 U | 11/1977 |
| JP | 9-322454 A | 12/1997 |
| JP | 2004-312886 A | 11/2004 |
| JP | 2007-300718 A | 11/2007 |
| JP | 2013-198237 A | 9/2013 |

OTHER PUBLICATIONS

Office Action dated Nov. 28, 2018, by the Chinese Patent Office in corresponding Chinese Patent Application No. 201480080595.4 and English translation of the Office Action. (15 pages).

International Search Report (PCT/ISA/210) dated Oct. 7, 2014, by the Japanese Patent Office as the International Searching Authority for International Application No. PCT/JP2014/069684.

The extended European Search Report dated Dec. 15, 2017, by the European Patent Office in corresponding European Patent Application No. 14897952.9-1809. (8 pages).

Office Action dated May 10, 2019, by the Chinese Patent Office in corresponding Chinese Patent Application No. 201480080595.4 and English translation of the Office Action. (13 pages).

* cited by examiner

ROTARY ELECTRIC MACHINE

TECHNICAL FIELD

The present invention relates to a rotary electric machine used for a turbine power generator and so on, and particularly relates to a rotary electric machine in which ventilation and cooling performance of a rotor is improved.

BACKGROUND ART

In rotor winding ends of a related-art rotary electric machine, a second flow path which penetrates a high-speed flow region and a vortex flow region is provided in a mountain-shaped portion of an insulator forming a cooling air passage for reducing the temperature, thereby eliminating the vortex flow region and making the temperature distribution uniform (for example, refer to Patent Literature 1).

CITATION LIST

Patent Literature

Patent Literature 1: JP-A-9-322454

SUMMARY OF INVENTION

Technical Problem

In the rotary electric machine having such rotor, the rotor winding ends are cooled by a cooling gas circulating between adjacent coils held by a spacer as an insulator. When the output of the rotary electric machine is increased, there is a problem that the temperature of the rotor is increased to be higher than a heatproof temperature of the insulator with the increase of a field current of the rotor.

The present invention has been made in view of the above problem, and an object thereof is to obtain a rotary electric machine having a rotor in which an insulation failure does not occur even when the output of the rotary electric machine is increased by improving the cooling performance at the rotor winding ends of the rotor of the rotary electric machine.

Solution to Problem

According to an embodiment of the present invention, there is provided a rotary electric machine including a rotor winding wound around a rotor core with a gap, rotor winding ends formed by the rotor winding protruding to an end surface of the rotor core in an axial direction, spacers arranged between adjacent rotor winding ends, mountain-shaped winding support portions provided on both surfaces of the spacers and having an apex with an obtuse angle, meandering ventilation paths formed on both surfaces of the spacers by the mountain-shaped winding support portions, and wave-shaped winding support portions formed in the meandering ventilation paths along the meandering ventilation paths.

Also according to an embodiment of the present invention, there is provided a rotary electric machine including a rotor winding wound around a rotor core with a gap, rotor winding ends formed by the rotor winding protruding to an end surface of the rotor core in an axial direction, spacers arranged between adjacent rotor winding ends, arc-shaped winding support portions provided on both surfaces of the spacers, meandering ventilation paths formed on both surfaces of the spacers by the arc-shaped winding support portions and wave-shaped winding support portions formed in the meandering ventilation paths along the meandering ventilation paths and having a shape in which arc-shaped winding support portions are connected.

Advantageous Effects of Invention

When adopting the rotary electric machine according to the present invention, flow separation in the apex of the mountain-shaped winding support portion is suppressed, a vortex flow region behind the mountain-shaped winding support portion is reduced and the cooling gas uniformly flows over the entire meandering ventilation paths, therefore, pressure loss can be drastically reduced. Furthermore, the flow in the meandering ventilation paths formed in the spacers is made to be uniform, thereby suppressing local temperature increase at the rotor winding ends.

The foregoing and other objects, features, aspects and advantages of the present invention will become more apparent from the following detailed description of the present invention when taken in conjunction with the accompanying drawings.

DESCRIPTION OF EMBODIMENTS

Hereinafter, Embodiment 1 of the present invention will be explained with reference to the drawings.

In respective drawings, the same symbols denote the same or equivalent components.

Embodiment 1

Figure 1:
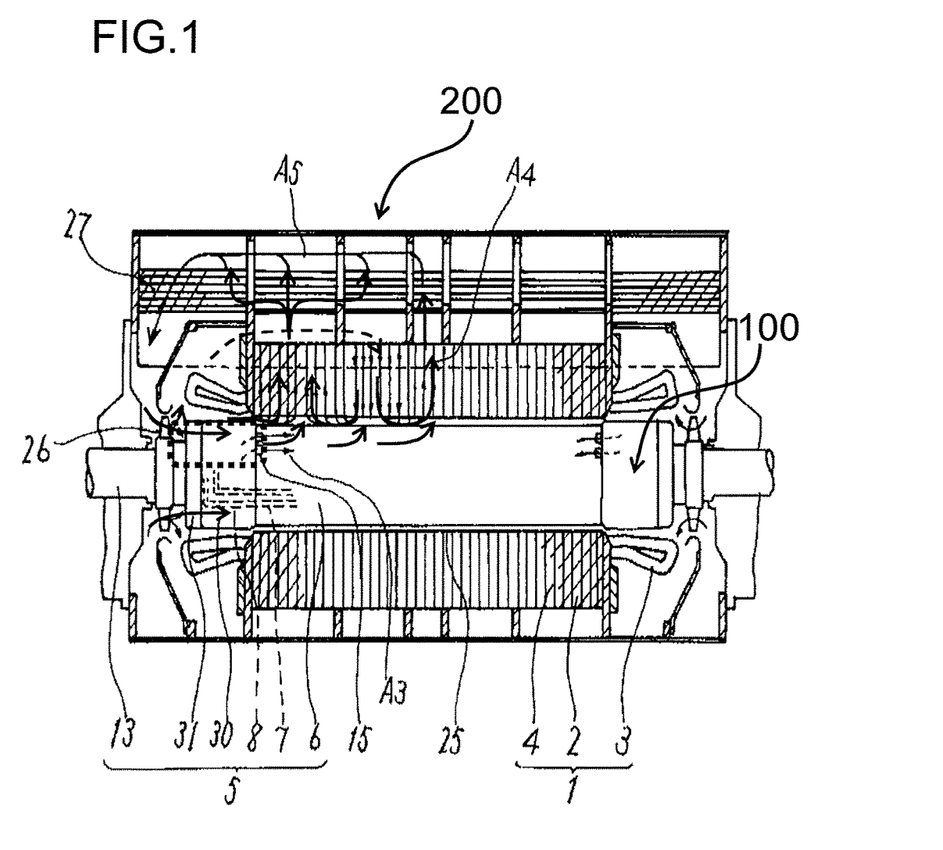
FIG. 1 is a cross-sectional side view of a turbine generator using a rotary electric machine according to Embodiment 1 of the present invention.
Figure 2:
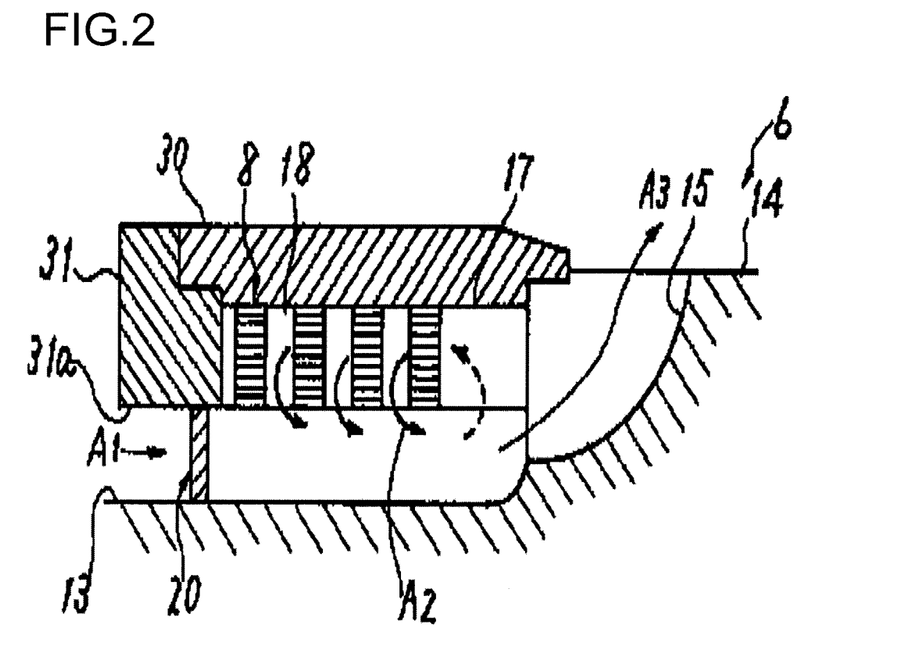
FIG. 2 is an enlarged cross-sectional view of a relevant part around rotor winding ends in FIG. 1.
Figure 3:
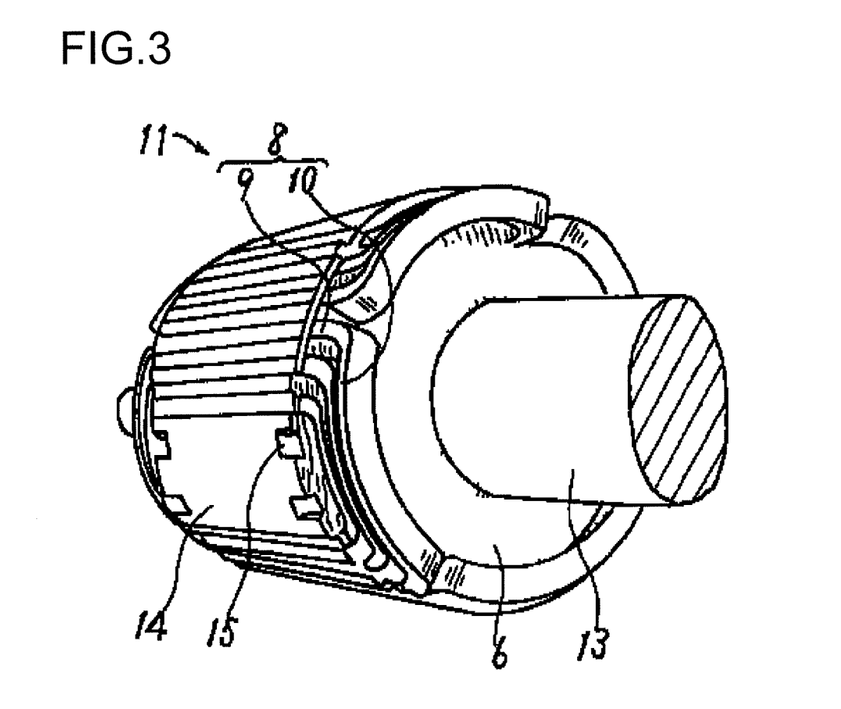
FIG. 3 is a perspective view showing a state where a coil retaining ring and an end ring are removed in FIG. 1.
Figure 4:
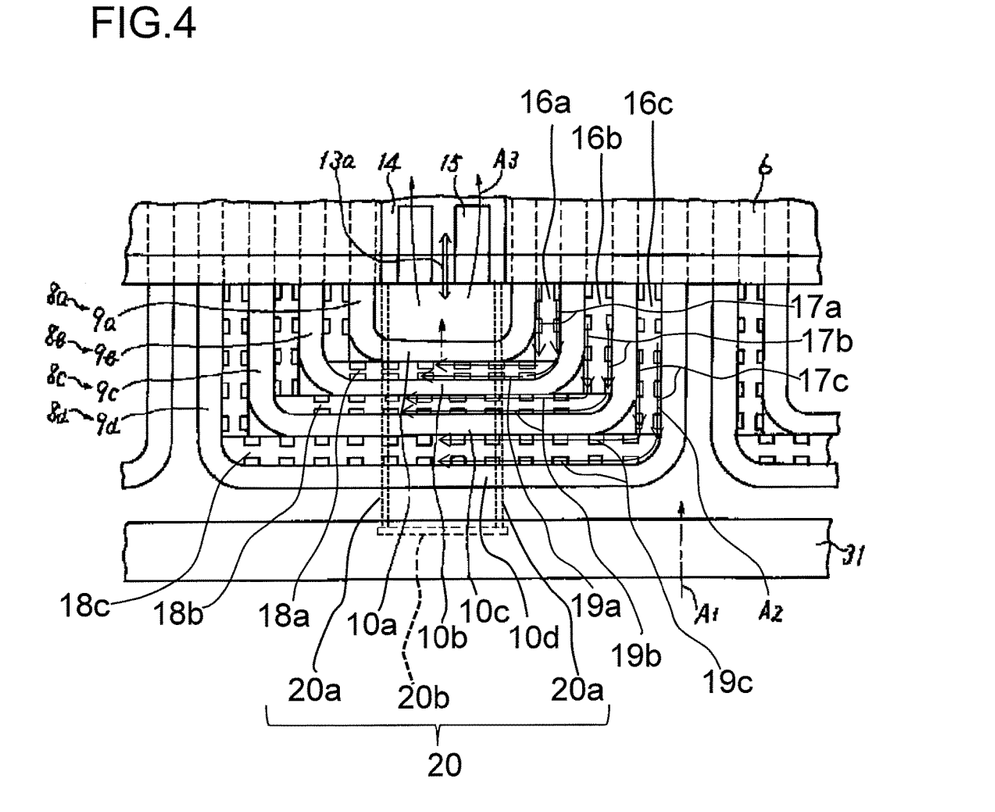
FIG. 4 is a plan view showing a relevant part of the rotor winding ends in FIG. 1.

FIG. 1 is a cross-sectional side view of a turbine generator using a rotary electric machine according to Embodiment 1 of the present invention. FIG. 2 is an enlarged cross-sectional view of a relevant part around rotor winding ends in FIG. 1, which is a side view of a region surrounded by a dotted line in FIG. 1. FIG. 3 is a perspective view of the rotor showing a state where a coil retaining ring and an end ring are removed in FIG. 1 and FIG. 4 is a plan view showing a relevant part of the rotor winding ends in FIG. 1 in an exploded manner.

First, a rotary electric machine 100 will be explained. As shown in FIG. 1, the rotary electric machine 100 is configured by coaxially arranging a stator 1 having a hollow cylindrical shape and a rotor 5 having a cylindrical shape a diameter of which is slightly smaller than a diameter of the hollow portion through a gap (air gap) 25. The stator 1 and the rotor 5 have conductive coils formed of copper respectively arranged in an axial direction of an iron core slot. When the rotor 5 is rotated in a state where the coils on the rotor 5 side are excited, the electric current is induced on the stator 1 side. At this time, large heat caused by electrical loss is generated in the stator 1 or rotor 5, therefore, particular cooling is required. Accordingly, the rotary electric machine 100 performs forced cooling by installing a fan 26 in the rotor 5 and feeding a cooling gas into the rotary electric machine 100. As the cooling gas for cooling the inside of the rotary electric machine 100, gases such as air or hydrogen are used.

Next, the cooling of the rotary electric machine 100 will be explained. As shown in FIG. 1, a turbine generator 200 includes the stator 1, the rotor 5, a fan 26 and a cooler 27. The stator 1 includes a stator core 2, a stator winding 3 and a duct 4. The rotor 5 includes a rotor core 6, a rotor winding 7, a coil retaining ring 30, an end ring 31 and a rotating shaft 13. The rotating shaft 13 is supported by a bearing (not shown) so as to rotate freely, and the fan 26 is symmetrically attached to an end of the rotating shaft 13. An outer periphery of the rotor core 6 and an inner periphery of the stator core 2 are separated by the gap (air gap) 25.

The rotating shaft 13 rotates, the cooling gas pressure-fed by the fan 26 is divided into two ways, and one cooling gas is introduced from an opening 31a (see FIG. 2) of the end ring 31 and cools rotor winding ends 8 inside the coil retaining ring 30, then, the cooling gas is discharged from notch exhaust passages 15 in rotor magnetic poles 14 (see FIG. 3) in a direction of an arrow A3 into the gap 25. The other cooling gas cools ends of the stator winding 3 and flows inside the gap 25 in the axial direction, then, the cooling gas joins the cooling gas of the arrow A3. Then, the cooling gas flows inside the duct 4 along the arrow A4 and cools the stator core 2 and the stator winging 3. After that, the cooling gas flows along an arrow A5 (see FIG. 1), heat-exchanged by the cooler 27 and is recirculated to an intake side of the fan 26.

As shown in FIG. 3, the rotor winding 7 is formed of plural field coils in which a plurality of saddle-type rotor coils 11 having a rectangular shape which are formed by concentrated winding respectively around the rotor magnetic pole 14 are coaxially disposed inside plural slots (not shown) arranged in the rotor core 6 on the right and left of respective rotor magnetic fields 14, which are connected in series. The rotor coil 11 includes coil edges (not shown) inside the slot and the rotor winding ends 8 protruding from end surfaces of the rotor core 6. The rotor winding end 8 includes a pair of straight line portions 9 protruding from the end surfaces of the rotor core 6 in the direction of the rotating shaft and connection portions 10 connecting both straight line portions 9. A plurality of rotor winding ends 8 are arranged to protrude at end portions of the rotor magnetic poles 14 at intervals therebetween.

As shown in FIG. 2, the coil retaining ring 30 covers and holds respective outer peripheries of the rotor winding ends 8 and spacers 18 arranged between adjacent the rotor winding ends 8, and one end is fitted to an end portion of the rotor core 6. The end ring 31 is fitted to the other end of the coil retaining ring 30, and the cooling gas for cooling the rotor winding ends 8 is introduced from a space between the opening 31a provided to penetrate in the rotating shaft direction and the rotating shaft 13 as shown by the arrow A1. In a lower part of the rotor winding ends 8 in the width center of a circumferential direction, a partition plate 20 for gathering the cooling gas flowing in meandering ventilation paths provided in the spacers 18 to cool the rotor winding ends 8 and guiding the gas to the notch exhaust passages 15 as shown by arrows A2 (see FIG. 2) is provided on the rotating shaft 13.

Furthermore, 8a, 8b, 8c and 8d which are the rotor winding ends 8 respectively have 9a, 9b, 9c and 9d which are respectively pairs of straight line portions 9 and 10a, 10b, 10c and 10d which are connection portions 10 as shown in FIGS. 4. 16a, 16b and 16c which are respectively spacers 16 are disposed between respective 9a, 9b, 9c and 9d which are the straight line portions 9. 18a, 18b and 18c which are respectively spacers 18 are disposed between respective 10a, 10b, 10c and 10d which are the connection portions 10.

17a, 17b and 17c which are meandering ventilation paths 17 extending in a meandering manner are provided on both side surface portions of the respective spacers 16a, 16b and 16c along a longitudinal direction of side wall surfaces of respective straight line portions 9a, 9b, 9c and 9d on which the spacers 16 abut. Also, 19a, 19b and 19c which are meandering ventilation paths 19 extending in a meandering manner are provided on both side surface portions of the respective spacers 18a, 18b and 18c along a longitudinal direction of side wall surfaces of respective connecting portions 10a, 10b, 10c and 10d on which the spacers 18 abut.

In the meandering ventilation paths 17a, 17b and 17c, a side wall surface of each of the straight line portions 9a, 9b, 9c and 9d configures one wall surface of each of the meandering ventilation paths 17a, 17b and 17c. In the meandering ventilation paths 19a, 19b and 19c, a side wall surface of each of the connecting portions 10a, 10b, 10c and 10d configures one wall surface of each of the meandering ventilation paths 19a, 19b and 19c.

The partition plate 20 is configured so that a lower part is inserted into a groove (not shown) of the rotating shaft 13 (see FIG. 2), including a pair of side plates 20a one-side end surface of which abuts on the side wall of the rotor magnetic pole 14 and an endplate 20b bonded to the other side end surfaces of the pair of side plates 20a and arranged in the opening 31a (see FIG. 2) of the end ring 31.

Here, the spacers 16 will be briefly explained with reference to FIG. 4. On both end surface portions of respective spacers 16a, 18a, meandering grooves 21 (not shown) meandering and extending toward the longitudinal direction of respective spacers 16a, 18a are formed. Then, the spacer 16a is arranged between the straight line portions 9a and 9b and the spacer 18a is arranged between the connecting portions 10a and 10b respectively to be assembled. The meandering ventilation path 17a is formed by the meandering groove 21 (not shown) of the spacer 16a and the side wall surfaces of the straight line portions 9a, 9b. The meandering ventilation path 19a is formed by the meandering groove 21 of the spacer 18a and the side wall surfaces of the connecting portions 10a, 10b. The introduced cooling gas cools the straight line portions 9a, 9b and the connecting portions 10a, 10b while continuously flowing inside respective meandering ventilation paths 17a, 19a as shown in the arrow A2, which is guided to a space surrounded by right and left side plates 20a of the partition plate 20.

As shown in FIG. 4, the cooling gas in the rotor winding ends 8 is introduced from the opening 31a (see FIG. 2) of the end ring 31 as shown in the arrow A1, then, introduced into the meandering ventilation paths 17a, 17b and 17c on both sides of respective spacers 16a, 16b and 16c and continuously flows from the meandering ventilation paths 17a, 17b and 17c toward the direction of the arrow A2 representatively shown by a long dashed and short dashed line as the arrow A2 into the meandering ventilation paths 19a, 19b and 19c on both sides of respective spacers 18a, 18b and 18c. Then, the flows from the right and left meandering ventilation paths 19a, 19b and 19c join (not shown) at the central part, flowing in the space surrounded by the right and left side plates 20a of the partition plate 20 toward the direction of the rotating shaft and guided to the notch discharge path 15.

As described above, the electrical resistance loss in the 8a, 8b, 8c and 8d which are the rotor winding ends 8 is absorbed by the cooling gas flowing through the meandering ventilation paths 17a, 17b, 17c, 19a, 19b and 19c, which suppresses the temperature increase of the rotor winding ends 8.

Figure 5:
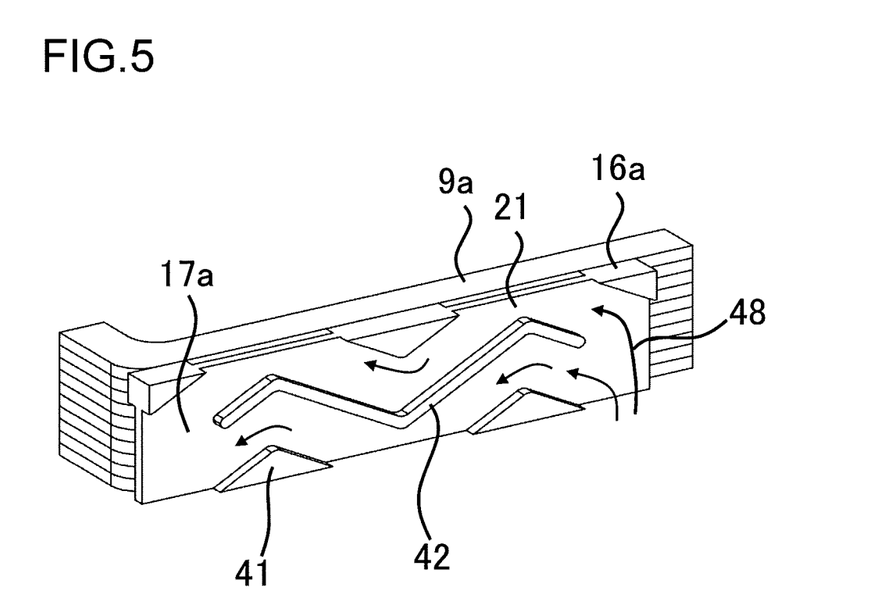
FIG. 5 is a perspective view showing a spacer of a rotary electric machine according to Embodiment 1 of the present invention.
Figure 6:
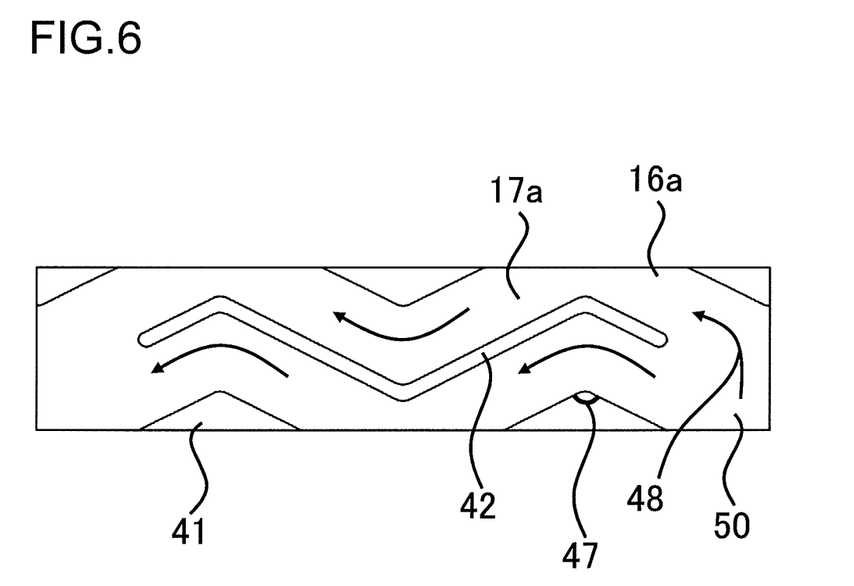
FIG. 6 is a side view showing the spacer of the rotary electric machine according to Embodiment 1 of the present invention.

FIG. 5 is a perspective view showing a spacer of a rotary electric machine according to Embodiment 1 of the present invention. FIG. 5 shows a state where the coil retaining ring is removed. The spacer 16a includes mountain-shaped winding support portions 41 and a wave-shaped winding support portion 42 inside the meandering ventilation path 17a. FIG. 6 is a side view showing the spacer of the rotary electric machine according to Embodiment 1 of the invention. Here, an apex angle 47 of the mountain-shaped winding support portions 41 is an obtuse angle.

As shown in FIG. 5 and FIG. 6, a cooling gas 48 flowing into the meandering ventilation path 17a provided in the spacer 16a is divided into two ways at an end of the wave-shaped winding support portion 42. As the apex angle 47 of the mountain-shaped winding support portion 41 is the obtuse angle in Embodiment 1, flow separation in the apex of the mountain-shaped winding support portion 41 is suppressed, and the cooling gas uniformly flows over the entire meandering flow path without causing a vortex flow region generated behind the mountain-shaped winding support portion 41.

Figure 7:
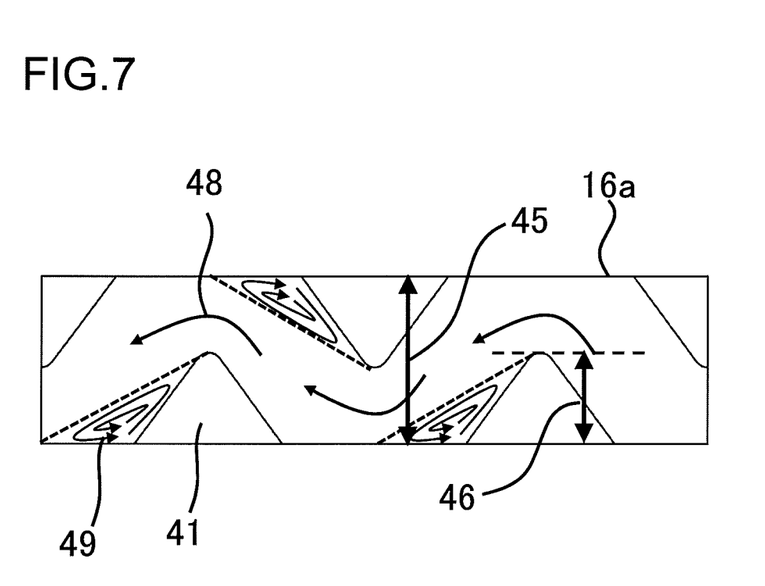
FIG. 7 is a side view showing a spacer of the rotary electric machine in a comparative example.

FIG. 7 is a side view showing a state of the spacer of the rotary electric machine in a comparative example. As shown in FIG. 7, the rotor windings 7 normally having several millimeters in thickness are stacked in a vertical direction in the drawing, therefore, it is necessary to set a mountain height 46 of the mountain-shaped winding support portion 41 to be equal to or larger than the half width of a width 45 of the spacer and to support the rotor winding 7 as the coil at least at one point for maintaining a retaining force of the rotor winding 7 by the spacer 16a over the entire area. Accordingly, the apex angle of the mountain-shaped winding support portion 41 is normally an acute angle and the flow of the cooling gas 48 flowing in the meandering ventilation path 17a is separated at the apex of the mountain-shaped winding support portion 41, which causes a vortex flow region 49 where the flow is stagnant behind the mountain-shaped winding support portion 41. Due to the existence of the vortex region 49, a cross-sectional area of the flow path in which the cooling gas 48 actually flows is reduced, and a high-speed flow region where the flow rate is increased is generated. As a result, pressure loss of the ventilation path is increased. Additionally, the vortex flow region 49 will be a heat-insulating layer in which heat exchange between the rotor winding ends 8 and the cooling gas 48 is suppressed. Accordingly, the rotor winding ends 8 contacting the vortex flow region 49 are increased in temperature as compared with the rotor winding ends 8 contacting the high-speed flow region.

Figure 8:
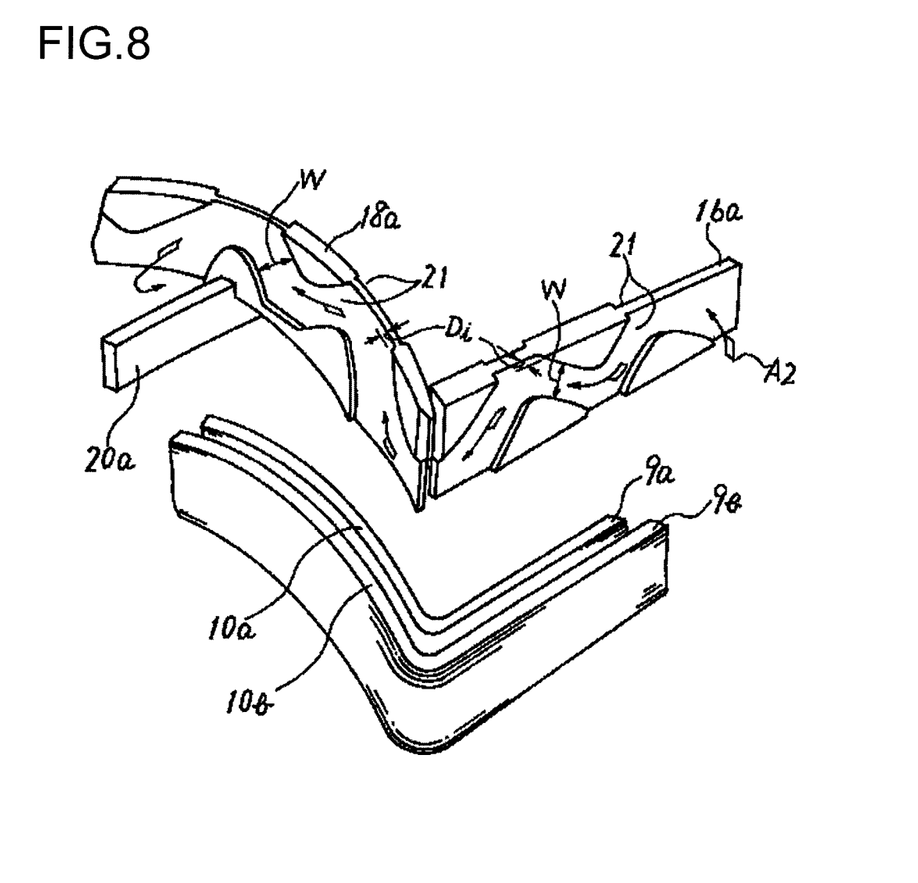
FIG. 8 is a perspective view showing a relevant parts of spacers of the rotary electric machine according to the comparative example.

FIG. 8 is a perspective view showing relevant parts of spacers of a rotary electric machine according to a comparative example. Also in the spacer 16a in the comparative example, the meandering grooves 21 having the same groove depth Di and the width W, meandering and extending toward the longitudinal direction of respective spacers 16a, 18a are formed on both side surface portions of respective spacers 16a, 18a in the same manner as Embodiment 1. Then, the spacer 16a is arranged between straight line portions 9a, 9b and the spacers 18a is arranged between the connecting portions 10a, 10b respectively to be assembled. The meandering ventilation path 17a is formed by the meandering groove 21 (not shown) of the spacer 16a and the side wall surfaces of the straight line portions 9a, 9b. The meandering ventilation path 19a is formed by the meandering groove 21 of the spacer 18a and the side wall surfaces of the connecting portions 10a, 10b. The introduced cooling gas cools the straight line portions 9a, 9b and the connecting portions 10a, 10b while continuously flowing inside respective meandering ventilation paths 17a, 19a as shown in the arrow A2, which is introduced to a space surrounded by right and left side plates 20a of the partition plate 20.

According to Embodiment 1 of the present invention, the cross-sectional area of the flow path through which the refrigerant actually flows is increased as compared with the structure of the comparative example, therefore, the flow rate is reduced, which can drastically reduce pressure loss proportional to a square of the flow rate. Furthermore, the flow in the meandering ventilation path 17a formed by the spacer 16a is made to be uniform, thereby suppressing the local temperature increase in the rotor winding ends 8.

Figure 9:
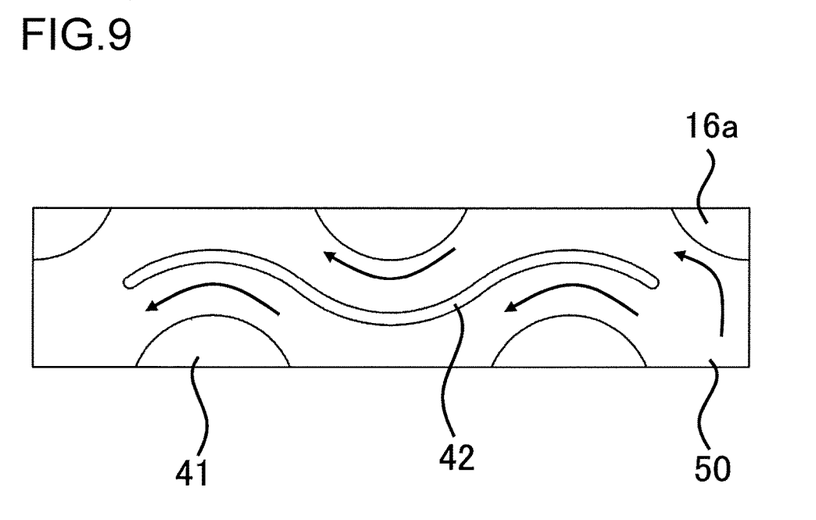
FIG. 9 is a side view showing a modification example of the spacer of the rotary electric machine according to Embodiment 1 of the present invention.

The shape of the mountain-shaped winding support portions 41 is not limited to a triangular shape but may be a trapezoid shape (not shown). The shape of the mountain-shaped winding support portions 41 of the spacer 16a may also be an arc shape as shown in FIG. 9. In this case, the shape of the wave-shaped winding support portion 42 is preferably a shape in which arcs are connected, and respective meandering ventilation paths 17a separated by the wave-shaped winding support portion 42 preferably have almost the same cross-sectional area in the flowing direction.

Embodiment 2

Figure 10:
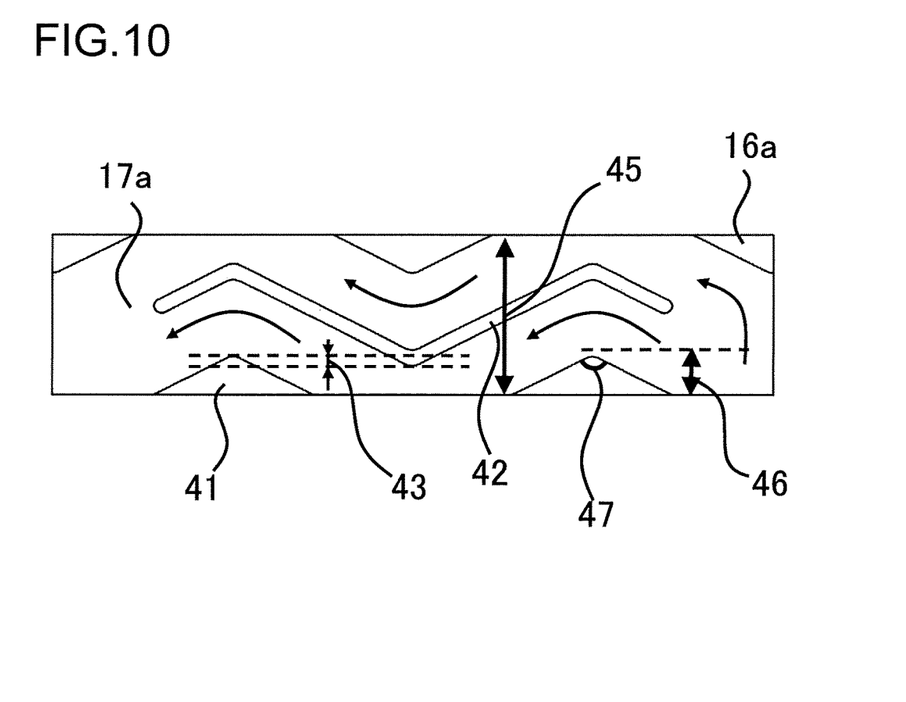
FIG. 10 is a side view showing a spacer of a rotary electric machine according to Embodiment 2 of the present invention.

FIG. 10 is a side view showing a spacer of a rotary electric machine according to Embodiment 2 of the present invention. The spacer 16a includes mountain-shaped winding support portions 41 and the wave-shaped winding support portion 42 in the meandering ventilation path 17a. Here, the mountain height 46 of the mountain-shaped winding support portion 41 is ⅓ or more as well as ½ or less of the width 45 of the spacers, and the apex angle 47 is an obtuse angle. Accordingly, the apex of the mountain-shaped winding support portion 41 and a valley portion of the wave-shaped winding support portion 42 have an overlapping region 43 in a circumferential direction.

Accordingly, in addition to the effect obtained in Embodiment 1, the retaining force of the stacked rotor winding ends 8 is increased as the overlapping region 43 is included.

The shape of the mountain-shaped winding support portions 41 is not limited to a triangular shape but may be a trapezoid shape. The shape of the mountain-shaped winding support portions 41 may also be an arc shape.

Embodiment 3

Figure 11:
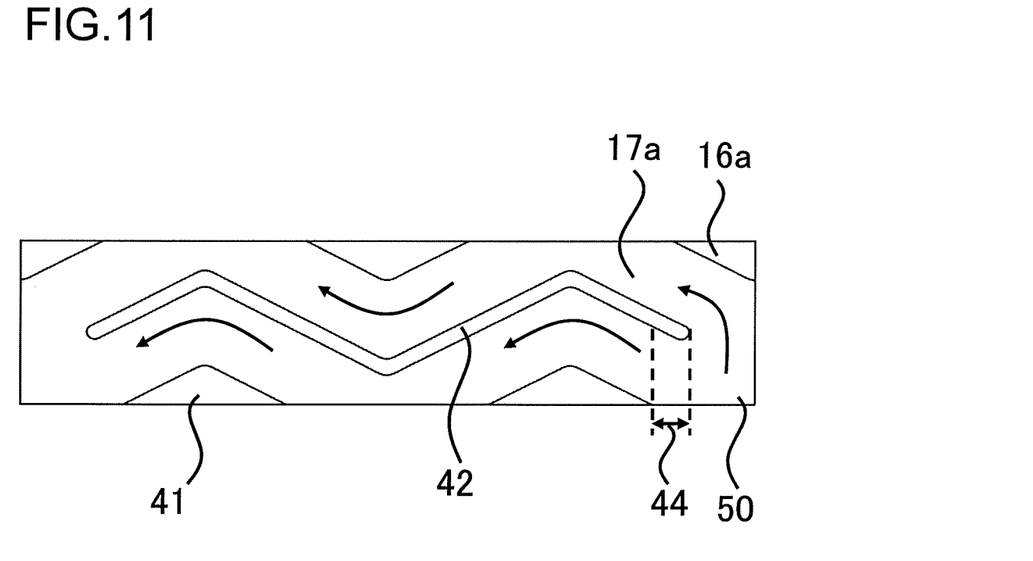
FIG. 11 is a side view showing a spacer of a rotary electric machine according to Embodiment 3 of the present invention.

FIG. 11 is a side view showing a spacer of a rotary electric machine according to Embodiment 3 of the present invention. In Embodiment 3, the spacer 16*a* includes mountain-shaped winding support portions 41 and the wave-shaped winding support portion 42 provided in the meandering ventilation path 17*a*. On a cooling gas inflow port 50 side, the wave-shaped winding support portion 42 has an end portion 44 extending to the vicinity of the center of the cooling gas inflow port 50.

Accordingly, in Embodiment 3, the flow rate of the gas flowing right and left sides of the wave-shaped winding support portion 42 can be adjusted to be uniform by the protruding length of the end portion 44 of the wave-shaped winding support portion 42, in addition to the effects obtained in Embodiment 1 and Embodiment 2. Therefore, the local temperature distribution in the rotor winding ends 8 can be further suppressed.

Figure 12:
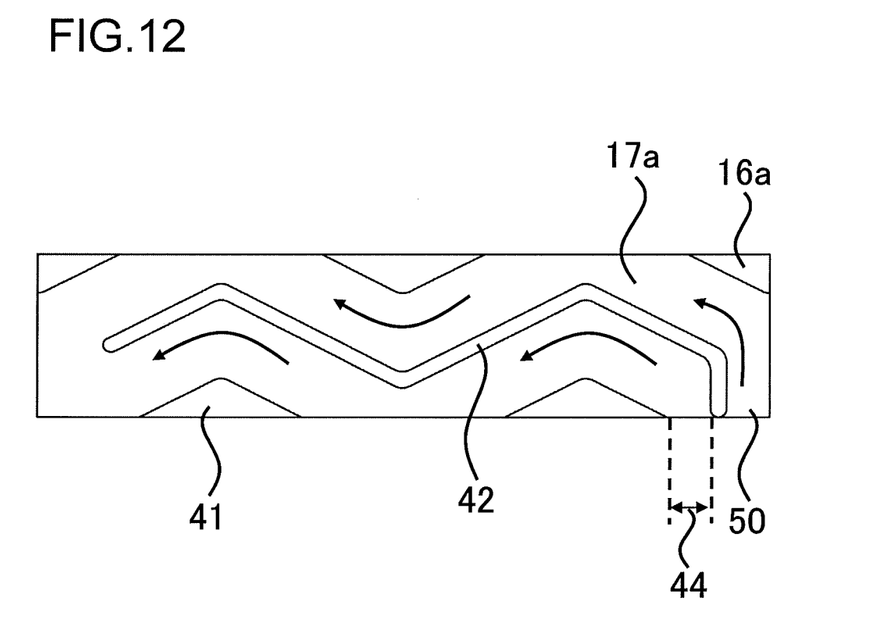
FIG. 12 is a side view showing a modification example of the spacer of the rotary electric machine according to Embodiment 3 of the present invention.

FIG. 12 is a side view showing a modification example of the spacer of the rotary electric machine according to Embodiment 3 of the present invention. As shown in FIG. 12, the spacer 16*a* includes mountain-shaped winding support portions 41 and the wave-shaped winding support portion 42 provided in the meandering ventilation path 17*a*. The wave-shaped winding support portion 42 may also have a structure in which the end portion 44 extends toward the cooling gas inflow port 50.

Accordingly, also in the modification example of Embodiment 3, the flow rate of the gas flowing right and left sides of the wave-shaped winding support portion 42 can be adjusted to be uniform by the protruding length of the end portion 44 of the wave-shaped winding support portion 42, in addition to the effects obtained in Embodiment 1 and Embodiment 2. Therefore, the local temperature distribution in the rotor winding ends 8 can be further suppressed.

In any of these embodiments, the explanation has been made on the assumption that the number of the winding support portion 42 in the meandering ventilation path 17*a* is one, however, two or more wave-shaped winding support portions 42 may be provided in parallel. Although the spacer 16*a* provided in the straight line portion 9 has been explained in Embodiment 1 to Embodiment 3, it is possible to apply Embodiment 1 to Embodiment 3 of the present invention to the arc-shaped spacer 18*a* provided in the connecting portion 10 in the same manner. Furthermore, the rotary electric machine having the ventilation paths has been representatively explained in the present invention, however, the present invention can be applied to spacers of other rotary electric machines having ventilation paths.

In the present invention, respective embodiments can be freely combined, and respective embodiments can be suitably modified or omitted within a scope of the invention.

REFERENCE SIGNS LIST

1 . . . stator, 2 . . . stator core, 3 . . . stator winding, 4 . . . duct,
5 . . . rotor, 6 . . . rotor core, 7 . . . rotor winding,
8, 8*a*, 8*b*, 8*c*, 8*d* . . . rotor winding end,
9, 9*a*, 9*b*, 9*d* . . . straight line portion,
10, 10*a*, 10*b*, 10*c*, 10*d* . . . connection portion,
11 . . . rotor coil, 13 . . . rotating shaft,
14 . . . rotor magnetic pole, 15 . . . notch exhaust passage,
16, 16*a*, 16*b*, 16*c* . . . spacer,
17, 17*a*, 17*b*, 17*c* . . . meandering ventilation path,
18, 18*a*, 18*b*, 18*c* . . . spacer,
19, 19*a*, 19*b*, 19*c* . . . meandering ventilation path,
20 . . . partition plate, 21 . . . meandering groove, 25 . . . gap, 26 . . . fan,
27 . . . cooler, 30 . . . coil retaining ring, 31 . . . end ring,
41 . . . mountain-shaped winding support portion,
42 . . . wave-shaped winding support portion,
47 . . . apex, 48 . . . cooling gas, 50 . . . cooling gas inflow port

The invention claimed is:

1. A rotary electric machine comprising:
a rotor winding wound around a rotor core with a gap;
rotor winding ends formed by the rotor winding protruding to an end surface of the rotor core in an axial direction;
spacers arranged between adjacent rotor winding ends;
mountain-shaped winding support portions provided on both surfaces of the spacers and having an apex with an obtuse angle;
meandering ventilation paths formed on both surfaces of the spacers by the mountain-shaped winding support portions; and
wave-shaped winding support portions formed in the meandering ventilation paths along the meandering ventilation paths.

2. The rotary electric machine according to claim 1,
the spacers are provided between adjacent rotor winding ends in an axial direction and a circumferential direction.

3. The rotary electric machine according to claim 1,
wherein a mountain height of the mountain-shaped winding support portions is ⅓ or more as well as ½ or less of the width of the spacers.

4. The rotary electric machine according to claim 1,
wherein the spacer includes an inflow port of a cooling gas, and
an end portion of the wave-shaped winding support portion protrudes to the vicinity of the center of the inflow port of the cooling gas.

5. A rotary electric machine comprising:
a rotor winding wound around a rotor core with a gap;
rotor winding ends formed by the rotor winding protruding to an end surface of the rotor core in an axial direction;
spacers arranged between adjacent rotor winding ends;
arc-shaped winding support portions provided on both surfaces of the spacers;
meandering ventilation paths formed on both surfaces of the spacers by the arc-shaped winding support portions; and
wave-shaped winding support portions formed in the meandering ventilation paths along the meandering ventilation paths and having a shape in which arc-shaped winding support portions are connected.

* * * * *